(12) United States Patent
Suzuki et al.

(10) Patent No.: US 10,402,134 B2
(45) Date of Patent: Sep. 3, 2019

(54) PRINT CONTROL DEVICE, PRINT CONTROL METHOD, AND RECORDING MEDIUM HAVING PRINT CONTROL PROGRAM RECORDED THEREON

(71) Applicant: SCREEN HOLDINGS CO., LTD., Kyoto (JP)

(72) Inventors: Tomohiro Suzuki, Kyoto (JP); Yoshihiko Onogawa, Kyoto (JP)

(73) Assignee: SCREEN HOLDINGS CO., LTD., Kyoto (JP)

(*) Notice: Subject to any disclaimer, the term of this patent is extended or adjusted under 35 U.S.C. 154(b) by 0 days.

(21) Appl. No.: 16/122,324

(22) Filed: Sep. 5, 2018

(65) Prior Publication Data

US 2019/0073170 A1 Mar. 7, 2019

(30) Foreign Application Priority Data

Sep. 6, 2017 (JP) ................ 2017-171628

(51) Int. Cl.
*H04N 1/04* (2006.01)
*G06F 3/12* (2006.01)
*H04N 1/00* (2006.01)

(52) U.S. Cl.
CPC .......... *G06F 3/1252* (2013.01); *G06F 3/1204* (2013.01); *G06F 3/1219* (2013.01); *G06F 3/1257* (2013.01); *G06F 3/1285* (2013.01); *H04N 1/00392* (2013.01); *H04N 1/00639* (2013.01)

(58) Field of Classification Search
CPC .... G06F 3/1252; G06F 3/1219; G06F 3/1204; G06F 3/1257; G06F 3/1285
USPC ........................................................ 358/1.13
See application file for complete search history.

(56) References Cited

U.S. PATENT DOCUMENTS

| | | | |
|---|---|---|---|
| 2009/0195834 A1* | 8/2009 | Toda ................ | G06F 3/1204 358/1.18 |
| 2009/0296119 A1* | 12/2009 | Kurihara ............ | B41J 13/0036 358/1.9 |
| 2011/0077759 A1 | 3/2011 | Yamasaki | |
| 2017/0371599 A1* | 12/2017 | Yoshioka ............. | B41J 29/42 |

FOREIGN PATENT DOCUMENTS

JP 2011-070449 A 4/2011

* cited by examiner

*Primary Examiner* — Houshang Safaipour
(74) *Attorney, Agent, or Firm* — McDermott Will & Emery LLP

(57) ABSTRACT

This application discloses a print control device suppressing paper waste without reducing the size of a print sheet that is to form a section upon printing for bookbinding. In one configuration example of the print control device, the numbers Np1 and Np2 of first and second print sheets to be used, which correspond to two pieces of imposition information $Dfly_1$ and $Dfly_2$ prepared for manuscript data Dd for a single print job, are determined so as not to waste paper, on the basis of the numbers of pages imposed on the first and second print sheets and a total page number Npg in the manuscript data Dd. On the basis of the determined numbers Np1 and Np2 and the two pieces of imposition information $Dfly_1$ and $Dfly_2$, overall imposition for the manuscript data Dd is determined such that, of the first and second print sheets, the shorter print sheets are sandwiched between the longer print sheets.

20 Claims, 12 Drawing Sheets

PRINT CONTROL DEVICE, PRINT CONTROL METHOD, AND RECORDING MEDIUM HAVING PRINT CONTROL PROGRAM RECORDED THEREON

BACKGROUND OF THE INVENTION

1. Field of the Invention

The present invention relates to a print control device, a print control method, and a recording medium having a print control program recorded thereon, which are intended to control printing for making a section (it is also called a "fold section" or "signature") to be used in bookbinding.

2. Description of the Background Art

In the process of bookbinding, a plurality of pages are printed per sheet of paper, and the printed sheets of paper are folded into sections, each being a unit component of a book. A plurality of such sections are sequentially stacked, bound, and then subjected to further steps, such as cutting, in order to complete a book product.

In the course of making a section, a sheet of paper (referred to below as a "print sheet") that is to form a section is folded into a paper stack after printing (such a printed sheet will also be referred to below as a "print sheet"), and as the number of pages to be printed on each section increases, the weight of the section increases as well, whereby it becomes unlikely for the print sheets to be fluttered or blown, resulting in improved post-processing (e.g., binding, cutting, etc.) workability. Moreover, as the number of pages per print sheet increases, book product strength improves. Accordingly, in the case where printing for making a section is performed by, for example, a print device designed to print on a roll of paper, an interval for cutting the roll of paper after printing is typically set at a high value in order to render each print sheet long.

In relation to the print control device as disclosed in the present application, Japanese Unexamined Patent Application Publication No. 2011-70449 describes an apparatus for generating imposition information which, when printing is performed on a print sheet that is to form a section, indicates positions of areas on the print sheet, each area corresponding to a page of a book product, and orientations of the pages on the print sheet. In the case of this imposition information generation apparatus, folding template information, which indicates a manner in which to fold a print sheet, is prepared in advance, thereby allowing easy generation of the imposition information.

However, only one value of print sheet size (referred to below as "sheet length") is typically set per print job (i.e., per book product), and increasing the value to set a longer sheet length, i.e., more pages per print sheet, tends to result in more blank pages per print sheet. For example, in the case where the sheet length is set such that 12 pages are contained per print sheet, when printing is performed on 14 print sheets that are to form 14 sections included in a book product with a total of 160 pages, the fourteenth print sheet contains four blank pages (corresponding to eight blank pages in the case of double-sided printing), resulting in some paper waste.

On the other hand, in the case where the sheet length is set such that eight pages are contained per print sheet, when a book product with a total of 160 pages is created, printing is performed on 20 print sheets, resulting in no blank pages and hence no paper waste.

However, in the case where the sheet length is set to a low value in order to avoid wasting paper and thereby reduce the number of pages per print sheet, it is necessary to redesign an imposition layout, which indicates positions, orientations, etc., of the pages on the print sheet. Moreover, setting the sheet length at a low value reduces the weight of a paper stack obtained by folding each print sheet after printing, with the result that the paper stack is prone to being fluttered or blown, leading to reduced post-processing workability.

Furthermore, the number of pages per print job (i.e., per book product) is not uniquely determined, and therefore, to avoid wasting paper, it is necessary to select or redesign an imposition layout depending on the number of pages for the print job.

SUMMARY OF THE INVENTION

Therefore, an objective of the present invention is to provide a print control device, method, etc., capable of suppressing paper waste without reducing the size of a print sheet that is to form a section upon printing for bookbinding.

To achieve the above objective, one aspect of the present invention is directed to a print control device for receiving manuscript data for a print job in bookbinding and for generating print data to be provided to a printer on the basis of the manuscript data. The device includes a template memory portion, a sheet number determination portion, an overall imposition information determination portion, and a print data generation portion. The template memory portion has imposition template information stored for each of two or more types of print sheets that are to form sections for use in bookbinding. The imposition template information indicates positions and orientations of pages to be imposed on the print sheets and lengths of the print sheets. The two or more types of print sheets are different in number of pages to be imposed. The sheet number determination portion determines the number of print sheets for each of the two or more types on the basis of the number of pages to be imposed on each of the two or more types of print sheets, indicated by the imposition template information, such that a sum of products obtained by respectively multiplying the numbers of pages to be imposed on the print sheets by the numbers of the print sheets is greater than or equal to a total number of pages in the manuscript data and a difference between the sum and the total number of pages in the manuscript data is less than a minimum of the numbers of pages imposed on the two or more types of print sheets. The overall imposition information determination portion generates overall imposition information on the basis of the imposition template information stored in the template memory portion and the number of print sheets determined for each of the two or more types by the sheet number determination portion. The overall imposition information specifies imposition layouts of all pages in the manuscript data. The print data generation portion generates the print data on the basis of the manuscript data and the overall imposition information.

In this aspect, the template memory portion has the imposition template information stored for each of the two or more types of print sheets different in number of pages to be imposed. The imposition template information indicates imposition patterns on print sheets that are to form sections for use in bookbinding (the imposition patterns represent positions and orientations of pages to be imposed and the lengths of the print sheets). On the basis of the numbers of pages indicated by such imposition template information, the number of print sheets is determined for each type such that the sum of the products of the numbers of pages to be imposed on the print sheets and the numbers of print sheets is greater than or equal to the total number of pages in the manuscript data and the difference between the sum and the total number of pages in the manuscript data is less than the minimum of the numbers of pages imposed on the two or more types of print sheets. On the basis of the numbers of print sheets thus determined and the imposition template information, the overall imposition information is generated, and on the basis of the overall imposition information and the manuscript data, the print data to be provided to the printer is generated. In this manner, overall imposition is determined using the imposition template information for the two or more types of print sheets different in number of pages to be imposed, i.e., the two or more types of print sheets are different in length. Thus, it is possible to increase the lengths of the print sheets while suppressing or reducing paper waste.

Another aspect of the present invention is directed to a print control method for generating print data to be provided to a printer on the basis of manuscript data received for a print job in bookbinding. The method includes a template storing step, a sheet number determination step, an overall imposition information determination step, and a print data generation step. In the template storing step, imposition template information is stored into a template memory portion for each of two or more types of print sheets that are to form sections for use in bookbinding. The imposition template information indicates positions and orientations of pages to be imposed on the print sheets and lengths of the print sheets. The two or more types of print sheets are different in number of pages to be imposed. In the sheet number determination step, the number of print sheets is determined for each of the two or more types on the basis of the number of pages to be imposed on each of the two or more types of print sheets, indicated by the imposition template information, such that a sum of products obtained by respectively multiplying the numbers of pages to be imposed on the print sheets by the numbers of the print sheets is greater than or equal to a total number of pages in the manuscript data and a difference between the sum and the total number of pages in the manuscript data is less than a minimum of the numbers of pages imposed on the two or more types of print sheets. In the overall imposition information determination step, overall imposition information is generated on the basis of the imposition template information stored in the template memory portion and the number of print sheets determined for each of the two or more types by the sheet number determination step. The overall imposition information specifies imposition layouts of all pages in the manuscript data. In the print data generation step, the print data is generated on the basis of the manuscript data and the overall imposition information.

Still another aspect of the present invention is directed to a non-transitory computer readable recording medium storing a print control program for generating print data to be provided to a printer on the basis of manuscript data received for a print job in bookbinding. The program causes a computer to execute a template storing step, a sheet number determination step, an overall imposition information determination step, and a print data generation step. In the template storing step, imposition template information is stored into a template memory portion for each of two or more types of print sheets that are to form sections for use in bookbinding. The imposition template information indicates positions and orientations of pages to be imposed on the print sheets and lengths of the print sheets. The two or more types of print sheets are different in number of pages to be imposed. In the sheet number determination step, the number of print sheets is determined for each of the two or more types on the basis of the number of pages to be imposed on each of the two or more types of print sheets, indicated by the imposition template information, such that a sum of products obtained by respectively multiplying the numbers of pages to be imposed on the print sheets by the numbers of the print sheets is greater than or equal to a total number of pages in the manuscript data and a difference between the sum and the total number of pages in the manuscript data is less than a minimum of the numbers of pages imposed on the two or more types of print sheets. In the overall imposition information determination step, overall imposition information is generated on the basis of the imposition template information stored in the template memory portion and the number of print sheets determined for each of the two or more types by the sheet number determination step. The overall imposition information specifies imposition layouts of all pages in the manuscript data. In the print data generation step, the print data is generated on the basis of the manuscript data and the overall imposition information.

The above and other objectives, features, modes, and effects of the invention will become more apparent from the following detailed description of the invention with reference to the accompanying drawings.

DETAILED DESCRIPTION OF THE PREFERRED EMBODIMENTS

Hereinafter, an embodiment of the present invention will be described with reference to the accompanying drawings.

1. Embodiment 1.1 Entire System Configuration for Creating Book Product

Figure 1:
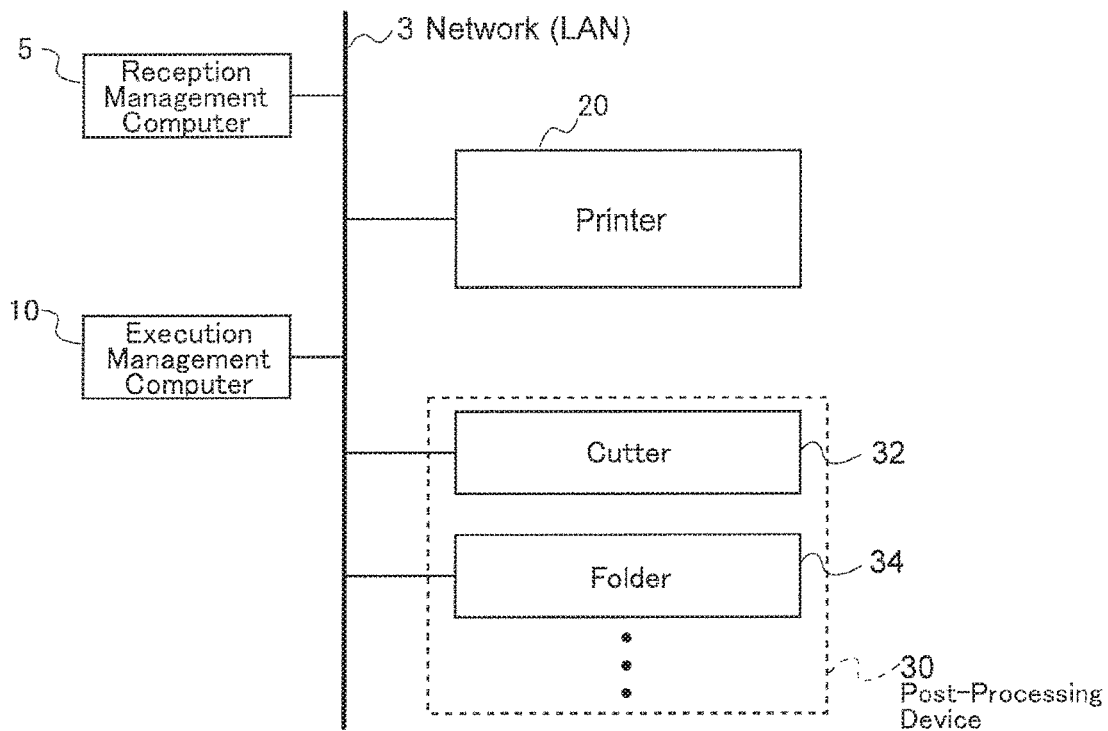
FIG. 1 is a diagram illustrating a configuration example of an entire system for creating a book product using a print system including an execution management computer serving as a print control device according to an embodiment of the present invention.

FIG. 1 is a block diagram illustrating a configuration example of an entire system for creating a book product using a print system including a print control device according to an embodiment of the present invention. In this configuration example, a reception management computer 5, an execution management computer 10, a printer 20, and a post-processing device 30, which includes a cutter 32, a folder 34, etc., are connected so as be able to communicate with one another via a network 3 such as a local area network (LAN). Note that the connection configuration shown in FIG. 1 is illustrative only. In the connection configuration shown in FIG. 1, the execution management computer 10 is connected to the printer 20 via the network 3 and functions as a print control device, as will be described later, but instead of this, the configuration may be such that the printer 20 is connected to a computer serving as a print control device via a dedicated communication cable and the computer is connected to the reception management computer and other elements via the network 3 so as to be able to communicate with the reception management computer and the other elements.

The reception management computer 5 manages print requests from outside the entire system, and holds data representing the contents of the print requests, as well as other information about the requests.

The execution management computer 10 manages execution of printing by the printer 20 and post-processing by the post-processing device 30 (e.g., sheet cutting by the cutter 32 and folding by the folder 34). Upon execution of printing by the printer 20, the execution management computer 10 functions as a print control device. The execution management computer 10 serving as the print control device, along with the printer 20, constitutes a print system.

Figure 2:
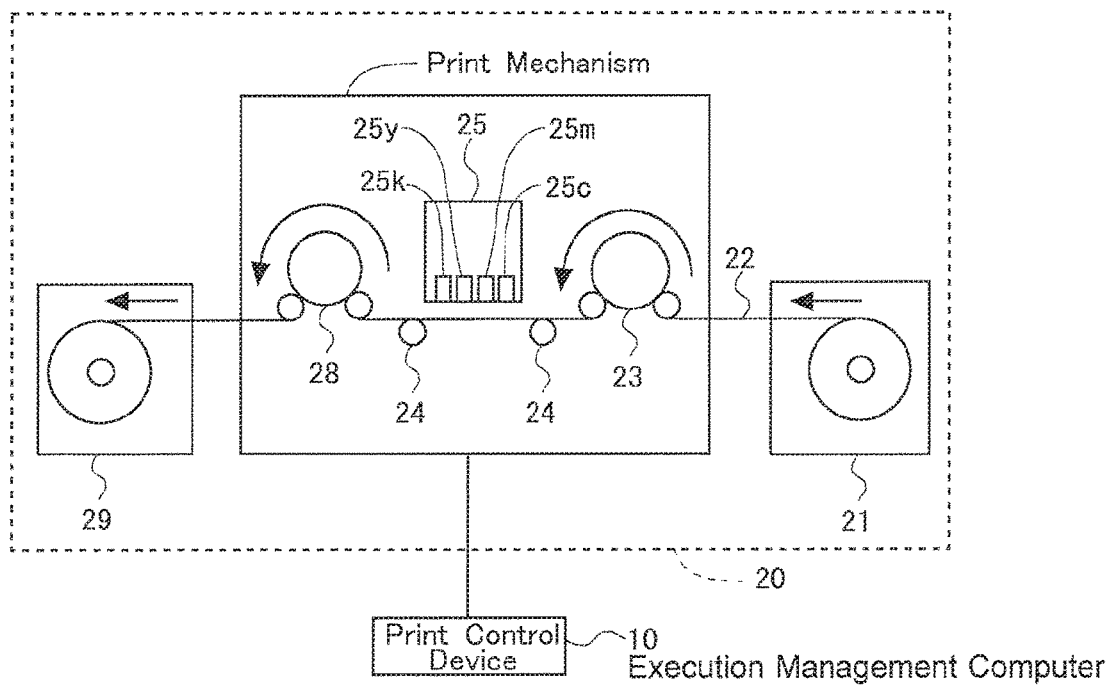
FIG. 2 is a schematic diagram illustrating a configuration example of an inkjet print device in the print system.

The printer 20 performs inkjet printing on continuous paper as exemplified by a roll of paper. Printers using rolls of paper, such as the printer 20, can be readily accommodated to print sheets having various lengths in a conveyance direction. FIG. 2 is a schematic diagram illustrating a configuration example of the printer 20 thus configured as an inkjet print device. The printer 20 is connected to the execution management computer 10, which serves as the print control device, via the network 3. The printer 20 includes a paper feeding portion 21 for supplying print paper (i.e., a roll of paper) 22, which is a base material, a first drive roller 23 for conveying the print paper 22 into a print mechanism, a plurality of support rollers 24 for conveying the print paper 22 within the print mechanism, a print portion 25 for printing on the print paper 22 by discharging ink, a second drive roller 28 for ejecting the print paper 22 from inside the print mechanism, and a sheet reel portion 29 for winding the print paper 22 after printing. The first drive roller 23 and the sheet reel portion 29, as above, transport the print paper 22 in a fixed conveyance direction from the paper feeding portion 21 toward the sheet reel portion 29. The print portion 25 includes a C inkjet head 25c, an M inkjet head 25m, a Y inkjet head 25y, and a K inkjet head 25k, which respectively discharge cyan (C), magenta (M), yellow (Y), and black (K) ink. Note that the print mechanism also includes ink tanks (not shown) provided therein in order to store the ink to be supplied to the inkjet heads 25c, 25m, 25y, and 25k.

The execution management computer 10 serving as the print control device controls the operation of the printer 20 as configured above. Upon provision of a printout command to the execution management computer 10, the execution management computer 10 controls the operation of the printer 20 such that the print paper 22 is transported from the paper feeding portion 21 to the sheet reel portion 29. Thereafter, in the course of transporting the print paper 22, printing is performed on the print paper 22 by discharging ink from the inkjet heads 25c, 25m, 25y, and 25k in the print portion 25.

1.2 Configuration and Operation of the Print Control Device

Figure 3:
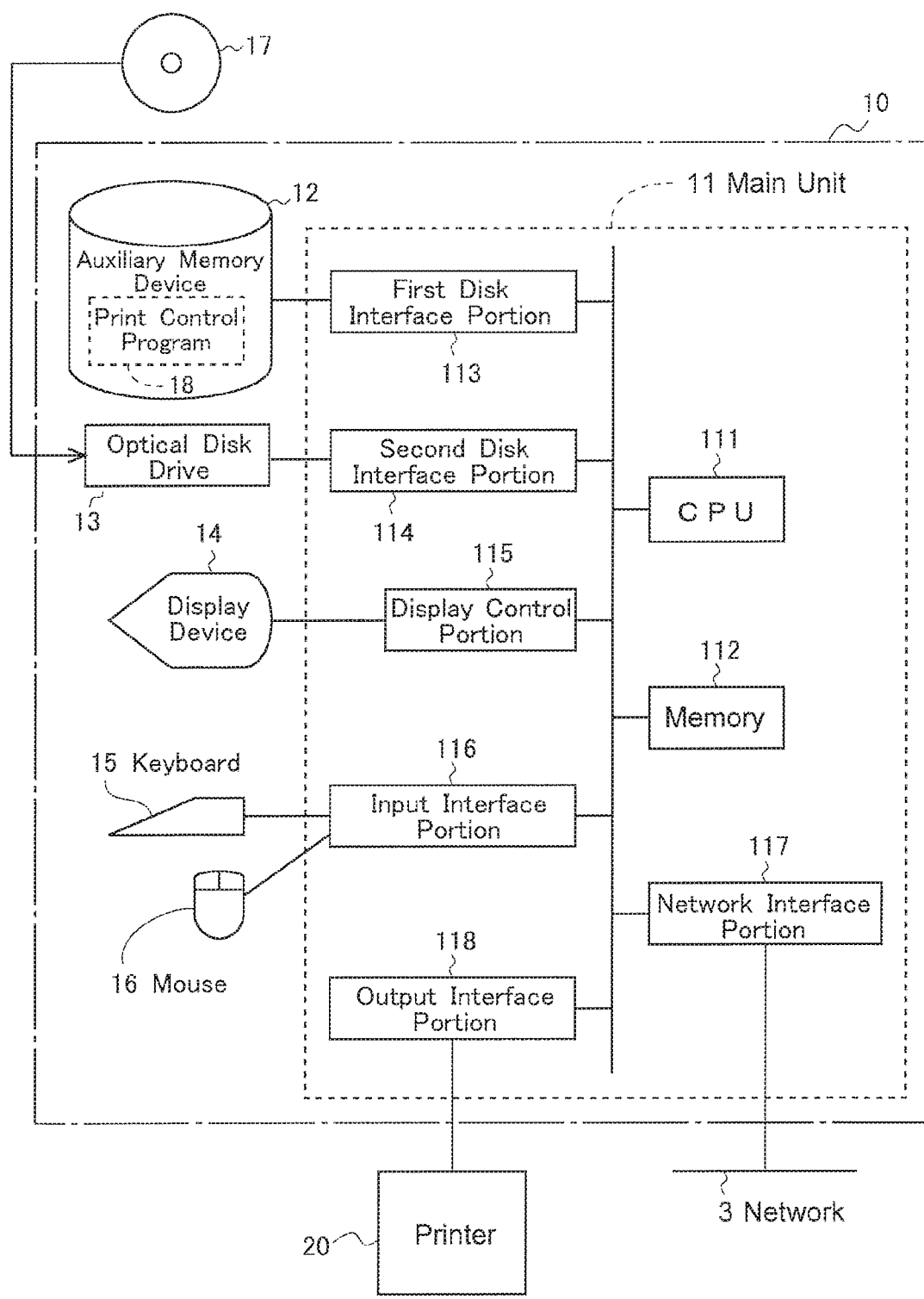
FIG. 3 is a block diagram illustrating a hardware configuration of the execution management computer serving as the print control device according to the embodiment.

FIG. 3 is a block diagram illustrating a hardware configuration of the execution management computer 10. The execution management computer 10 switches between programs to be executed by a CPU thereof, thereby functioning as a control device for managing task execution by various devices (such as the printer 20, the cutter 32, and the folder 34 in the example shown in FIG. 1). Note that the computer having the hardware configuration shown in FIG. 3 can also be used for the reception management computer 5.

The execution management computer 10 includes a main unit 11, an auxiliary memory device 12, an optical disk drive 13, a display device 14, a keyboard 15, a mouse 16, etc., as shown in FIG. 3. The main unit 11 includes a CPU 111, memory 112, a first disk interface portion 113, a second disk interface portion 114, a display control portion 115, an input interface portion 116, a network interface portion 117, and an output interface portion 118. The CPU 111, the memory 112, the first disk interface portion 113, the second disk interface portion 114, the display control portion 115, the input interface portion 116, the network interface portion 117, and the output interface portion 118 are connected to one another via a system bus. The first disk interface portion 113 is connected to the auxiliary memory device 12. The second disk interface portion 114 is connected to the optical disk drive 13. The display control portion 115 is connected to the display device 14. The input interface portion 116 is connected to the keyboard 15 and the mouse 16. The network interface portion 117 is connected to the network 3. The output interface portion 118 is connected to the printer 20 via a communication cable. The auxiliary memory device 12 is, for example, a magnetic disk device. The optical disk drive 13 accepts an optical disk 17, which is a computer readable recording medium such as a digital versatile disc (DVD) or a compact disc read-only memory (CD-ROM). The display device 14 is, for example, a liquid crystal display. The display device 14 is used for displaying information desired by an operator. The keyboard 15 and the mouse 16 are used by the operator to enter an instruction to the execution management computer 10.

The auxiliary memory device 12 has stored therein a control program 18 for managing process execution by a device to be controlled by the execution management computer 10. For convenience of description, it is assumed below that the control program 18 stored in the auxiliary memory device 12 is a program for managing execution of a printing process by the printer 20 (the program will be referred to below as the "print control program"). The CPU 111 executes the print control program 18 from the memory 112, thereby implementing various functions of the print control device. The memory 112 includes random access memory (RAM) and read-only memory (ROM). The memory 112 functions as a work area where the CPU 111 executes the print control program 18. Note that the print control program 18 is provided, for example, from an optical disk as mentioned earlier, such as a DVD, which has stored the program thereon. Accordingly, the user purchases an optical disk or suchlike (as denoted by reference numeral "17" in FIG. 3), which is a recording medium of the print control program 18, and inserts the disk 17 into the optical disk drive 13, whereby the print control program 18 is read from the disk 17 and installed to the auxiliary memory device 12. Alternatively, the print control program 18 may be transmitted through the network 3 and installed to the auxiliary memory device 12.

Figure 4:
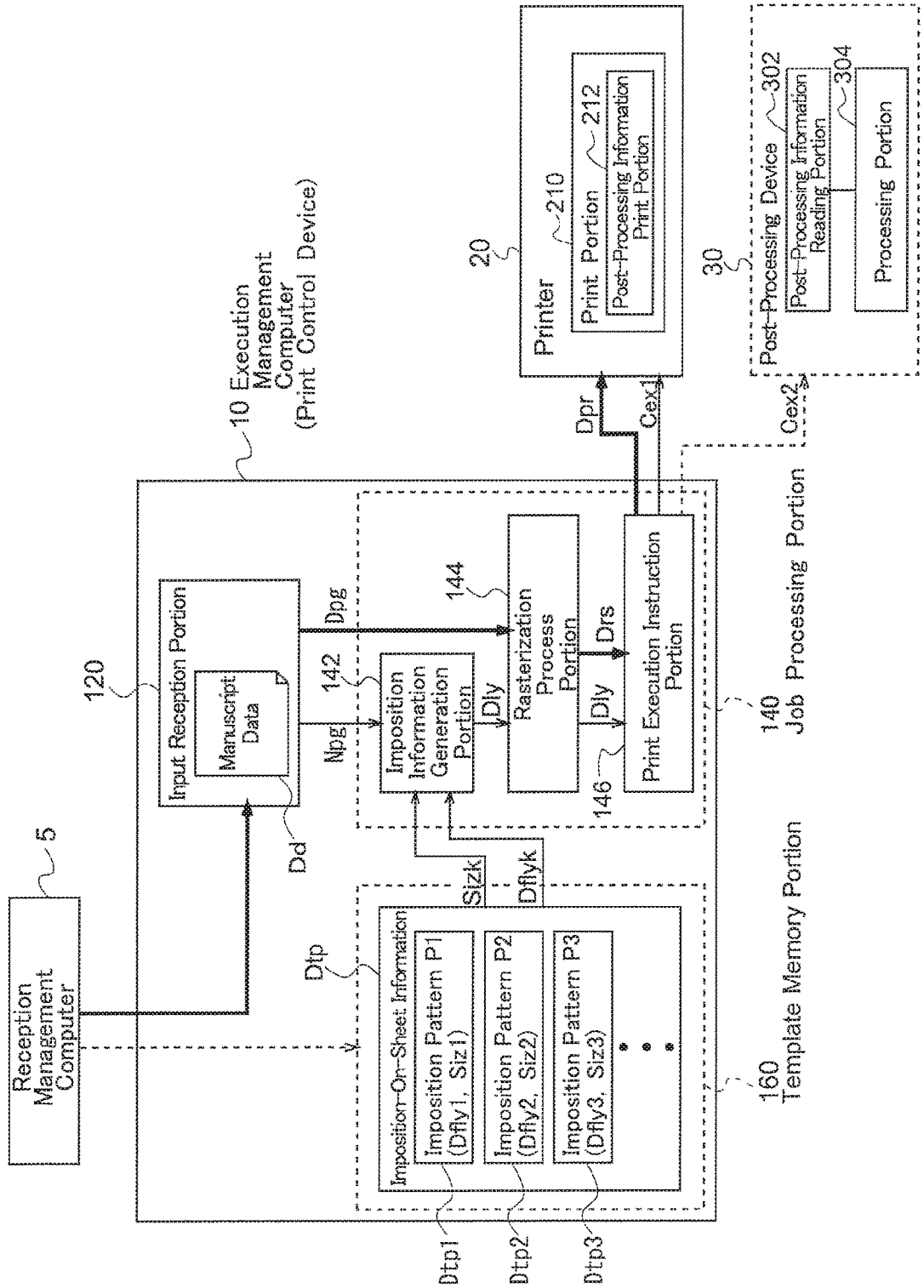
FIG. 4 is a block diagram illustrating a functional configuration of the print control device according to the embodiment.

The print control device according to the present embodiment is implemented in the form of software by causing the CPU 111 of the execution management computer 10 as configured above to execute the print control program 18. FIG. 4 is a block diagram illustrating a functional configuration of the print control device (denoted by the same reference numeral "10" as the execution management computer). As shown in FIG. 4, the print control device 10 functionally includes an input reception portion 120, a job processing portion 140, and a template memory portion 160.

The input reception portion 120 receives and holds manuscript data Dd, which represents a print target (i.e., contents to be printed in a book product to be created), from the reception management computer 5. The manuscript data Dd includes data for a plurality of pages representing the print target. The input reception portion 120 extracts page data Dpg from the manuscript data Dd and obtains the number of pages Npg in the manuscript data Dd (the number of pages Npg will be referred to below as the "total page number" for distinction from the number of pages per print sheet to be described later). The page data Dpg and the total page number Npg are inputted to the job processing portion 140.

The template memory portion 160 has imposition patterns representing positions, orientations, etc., of pages to be imposed on two or more types of print sheets that are to form sections for use in creating a book product. The imposition patterns are saved as imposition information $Dfly_k$ and sheet length $Siz_k$ (where k=1, 2, ... ). The sheet length indicates the length of the print sheet in the conveyance direction. Conventionally, a single print job for creating a book product uses only one type of print sheet (i.e., print sheets of the same size, or print sheets on which the same number of pages are to be imposed), but in the present embodiment, two or more types of print sheets are used. For example, the following two types of print sheets are used: a first print sheet for which the number of pages to be imposed (referred to below as the "number of imposed pages") is 16; and a second print sheet for which the number of imposed pages is 12. Imposition patterns for such two or more types of print sheets are represented by data Dtp (referred to below as "imposition-on-sheet information"), which includes imposition information $Dfly_k$ and sheet length $Siz_k$ (where k=1, 2, ... ) and is generated in advance by an imposition template generation process to be described later (see FIG. 6).

The job processing portion 140 includes an imposition information generation portion 142, a rasterization process portion 144, and a print execution instruction portion 146, as shown in FIG. 4. The imposition information generation portion 142 receives a total page number Npg in manuscript data Dd from the input reception portion 120 and reads imposition template information $Dtp_k$, including imposition information $Dfly_k$ and sheet length $Siz_k$, for two or more types of print sheets to be used for a print job corresponding to the manuscript data Dd, from the template memory portion 160. On the basis of the total page number Npg and the imposition template information $Dtp_k$ (i.e., the imposition information $Dfly_k$ and the sheet length $Siz_k$), the imposition information generation portion 142 generates overall imposition information Dly representing imposition layouts of all pages in the manuscript data Dd (the generation process will be described in detail later).

The rasterization process portion 144 receives the overall imposition information Dly from the imposition information generation portion 142 and the page data Dpg from the input reception portion 120. On the basis of the overall imposition information Dly, the rasterization process portion 144 rasterizes the page data Dpg, thereby generating raster data Drs, which is bitmap data representing a print target and will be referred to below as "target raster data".

Once the target raster data Drs is generated on the basis of the manuscript data Dd from the input reception portion 120, as described above, the print execution instruction portion 146 receives the target raster data Drs, as well as the overall imposition information Dly generated by the imposition information generation portion 142, and transmits the received data to the printer 20 as print data Dpr after making a data format change as necessary. At this time, the print execution instruction portion 146 also transmits a print execution control signal Cex1 to the printer 20 in order to control the printer 20. Note that the print execution instruction portion 146, along with the rasterization process portion 144, constitutes a print data generation portion.

The printer 20 receives the print data Dpr from the print control device 10 and performs a printing process based on the print data Dpr. Note that the printer 20 functionally includes a print portion 210 which includes a post-processing information print portion 212, as shown in FIG. 4, and prints the page data Dpg included in the manuscript data Dd and, as necessary, post-processing information based on the overall imposition information Dly. As the post-processing information, the printer 20 prints, for example, marks indicating positions at which a roll of paper is cut by the cutter 32 after printing (referred to below as "cutting positions") and print sheet length information specifying the cutting positions (see FIG. 12A to be described later). Note that instead of printing such post-processing information, post-processing information that is to be referenced by the post-processing device 30 including the cutter 32 may be transmitted to the post-processing device 30, for example, as a part or whole of an execution control signal Cex2 for a post-processing task.

Described next is the configuration of the imposition information generation portion 142 in the print control device 10 as above.

Figure 5A:
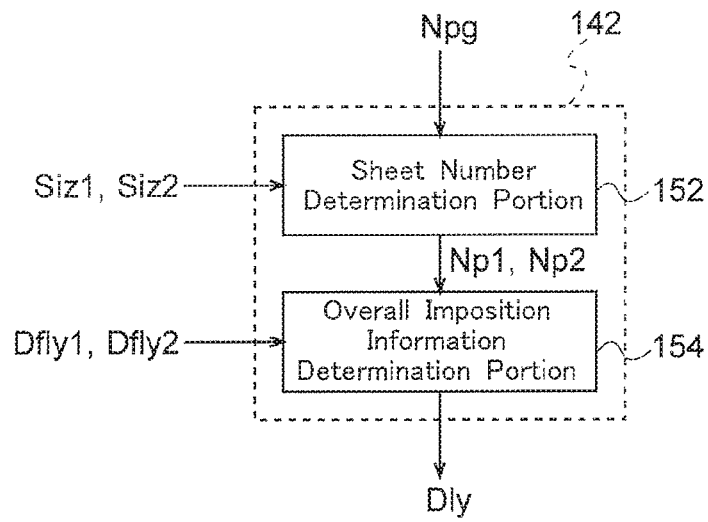
FIG. 5A is a block diagram illustrating a first configuration example of an imposition information generation portion in the embodiment.

FIG. 5A is a block diagram illustrating a first configuration example of the imposition information generation portion 142. In this configuration example, the imposition information generation portion 142 includes a sheet number determination portion 152 and an overall imposition information determination portion 154. The sheet number determination portion 152 receives predetermined sheet lengths $Siz_1$ and $Siz_2$ of first and second print sheets from the template memory portion 160, in addition to the total page number Npg in the manuscript data Dd from the input reception portion 120. On the basis of the total page number Npg and the sheet lengths $Siz_1$ and $Siz_2$, the sheet number determination portion 152 performs a predetermined computation process to determine the number of first print sheets Np1 and the number of second print sheets Np2, such that the total number Nsum of pages imposed on the first and second print sheets to be used, i.e., the sum of products obtained by respectively multiplying of the numbers of pages imposed on the first and second print sheets by the numbers of the first and second print sheets, equals the total page number Npg in the manuscript data Dd (details will be described later).

The overall imposition information determination portion 154 receives the numbers of first and second print sheets Np1 and Np2, as well as imposition information $Dfly_1$ and $Dfly_2$ for the first and second print sheets from the template memory portion 160. On the basis of the numbers of first and second print sheets Np1 and Np2 and the imposition information $Dfly_1$ and $Dfly_2$, the overall imposition information determination portion 154 generates overall imposition information Dly specifying imposition layouts of all pages in the manuscript data Dd (details will be described later with reference to FIG. 12A).

Figure 5B:
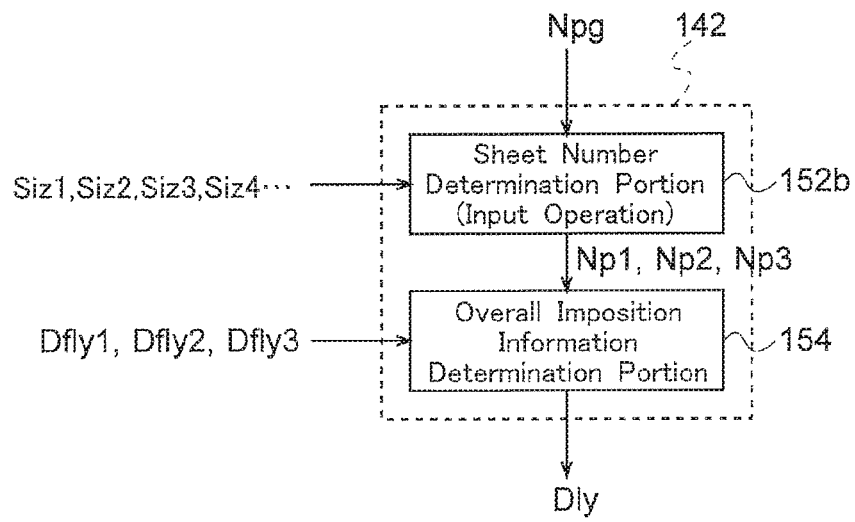
FIG. 5B is a block diagram illustrating a second configuration example of the imposition information generation portion in the embodiment.

FIG. 5B is a block diagram illustrating a second configuration example of the imposition information generation portion 142. In this configuration example also, the imposition information generation portion 142 includes a sheet number determination portion 152b and an overall imposition information determination portion 154. However, the sheet number determination portion 152b in this configuration example differs from the sheet number determination portion 152 in the first configuration example in that the sheet number determination portion 152b receives sheet lengths which are not predetermined and therefore selected by a predetermined user input operation to designate two or more types of print sheets, e.g., using the keyboard 15 or the mouse 16 of the execution management computer 10 serving as the print control device. For example, the user designates first through third print sheets from among print sheets for which imposition patterns are prestored in the template memory portion 160, thereby selecting sheet lengths $Siz_1$, $Siz_2$, and $Siz_3$ of the first through third print sheets. The sheet number determination portion 152b determines the number of first print sheets Np1, the number of second print sheets Np2, and the number of third print sheets Np3, such that the total number Nsum of pages imposed on the first through third print sheets designated to be used, i.e., the sum of products obtained by respectively multiplying the numbers of pages imposed on the first through third print sheets by the numbers of the first through third print sheets, is greater than or equal to the total page number Npg in the manuscript data Dd and the difference between the sum Nsum and the total page number Npg is as small as possible. For example, the numbers of first, second, and third print sheets Np1, Np2, and Np3 are determined such that the difference between the sum Nsum and the total page number Npg is less than the minimum of the numbers of pages imposed on the first through third print sheets. In the case where the imposition information generation portion 142 in such a configuration example is used, the number of print sheets is determined for each type of print sheet on the basis not only of the number of pages indicated by the imposition template information Dtp stored in the template memory portion 160 but also of a user input/selection operation, and therefore, the number of print sheets to be used can be determined for each type of print sheet so as to better meet the user's intention depending on individual requirements of book products or suchlike to be created. Note that the sheet number determination portion 152b may be configured such that the numbers of first, second, and third print sheets Np1, Np2, and Np3 are also determined through a predetermined user input/selection operation.

The overall imposition information determination portion 154 receives the numbers of first, second, and third print sheets Np1, Np2, and Np3, as well as imposition information $Dfly_1$, $Dfly_2$, and $Dfly_3$ for the first through third print sheets from the template memory portion 160. On the basis of the numbers of first, second, and third print sheets Np1, Np2, and Np3 and the imposition information $Dfly_1$, $Dfly_2$, and $Dfly_3$, the overall imposition information determination portion 154 generates overall imposition information Dly specifying imposition layouts of all pages in the manuscript data Dd (details will be described later with reference to FIG. 12A).

1.2.1 Imposition Template Generation Process

Described next is an imposition template generation process for creating imposition template information $Dtp_k$ (where k=1, 2, . . . ), including imposition information $Dfly_k$ and sheet length $Siz_k$, for two or more types of print sheets, to be stored in the template memory portion 160 of the print control device 10 as above. In the present embodiment, the print control program includes a program for the imposition template process, and the imposition template process is executed before overall imposition information Dly is generated on the basis of manuscript data Dd. As a result, imposition template information $Dtp_k$ corresponding to the manuscript data Dd is generated and stored into the template memory portion 160. Alternatively, the imposition template generation process may be executed on the reception management computer 5 so that imposition template information $Dtp_k$ is generated on the reception management computer 5 and sent to the print control device 10 so as to be stored into the template memory portion 160.

Figure 6:
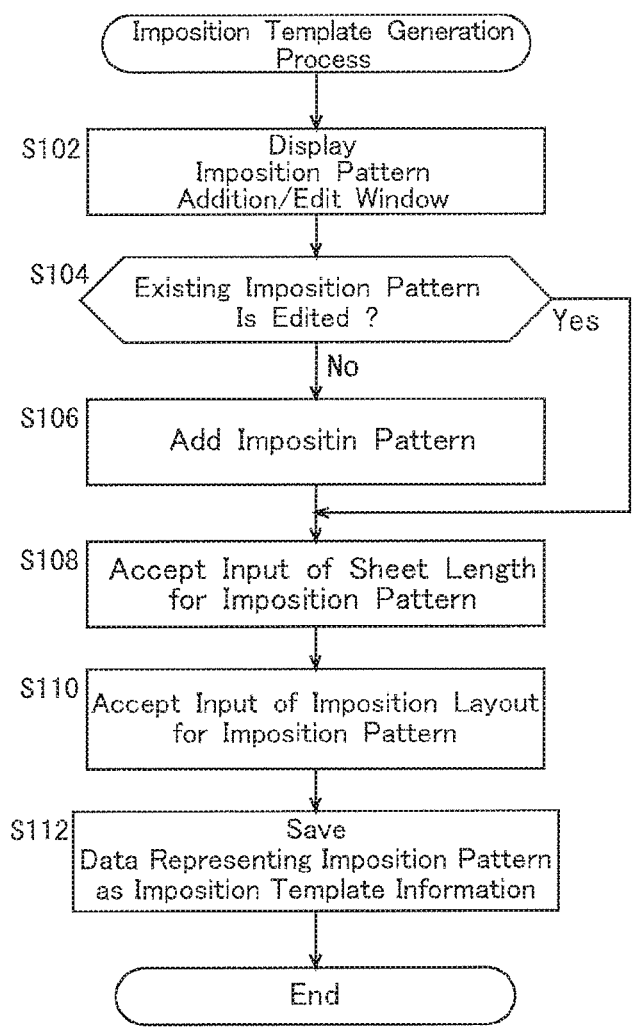
FIG. 6 is a flowchart showing an imposition template generation process in the embodiment.

FIG. 6 is a flowchart showing the imposition template generation process. When creating imposition template information $Dtp_k$ required for printing based on new manuscript data Dd, the CPU of the reception management computer 5 operates to implement the following procedure.

First, an imposition pattern addition/edit window for a print sheet is displayed (step S102). Next, whether to edit an existing imposition pattern is determined on the basis of a user operation on the addition/edit window (step S104). When the determination result is to not edit the existing imposition pattern, a new imposition pattern is added (step S106). In this case, a data area is reserved for imposition template information $Dtp_k$ for the new imposition pattern, and the process advances to step S108 with the new imposition pattern being set as the "target imposition pattern". When the determination result at step S104 is to edit the existing imposition pattern, the process advances to step S108 with the existing imposition pattern being set as the target imposition pattern. At step S108, a user input operation to designate a sheet length $Siz_k$ for the target imposition pattern is accepted. Next, a user input operation to designate an imposition layout for the target imposition pattern is accepted (step S110). As a result, imposition information $Dfly_k$ is generated. Thereafter, data including the imposition information $Dfly_k$ and the sheet length $Siz_k$ for the target imposition pattern is saved as imposition template information $Dtp_k$ (step S112).

In the present embodiment, the template generation process (FIG. 6) is executed a number of times corresponding to the number of types of print sheets to be used in the printing process for the manuscript data Dd.

1.2.2 Input Reception Process

Figure 7:
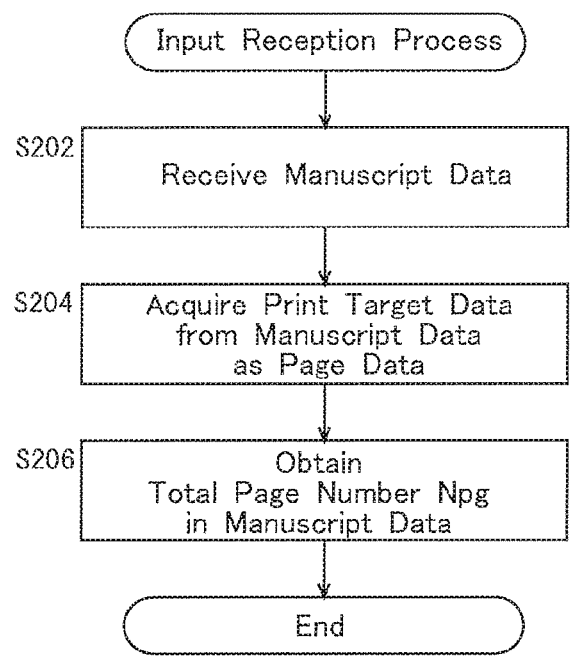
FIG. 7 is a flowchart showing an input reception process in the embodiment.

Next, an input reception process for implementing the input reception portion 120 of the print control device 10 shown in FIG. 4 in the form of software on the execution management computer will be described with reference to FIG. 7. FIG. 7 is a flowchart showing the input reception process. In the input reception process, the CPU 111 operates as below in accordance with a predetermined program included in the aforementioned print control program.

When manuscript data Dd is sent from the reception management computer 5 to the execution management computer 10 via the network 3, the CPU 111 receives and holds the manuscript data Dd (step S202). Next, the CPU 111 acquires data representing a print target, e.g., text data, image data, and/or illustration data, from the manuscript data Dd as page data Dpg (step S204). Thereafter, the input reception process ends once the CPU 111 obtains a total page number Npg in the manuscript data Dd (step S206). Note that the CPU 111 provides the job processing portion 140 with the page data Dpg acquired from the manuscript data Dd and the total page number Npg (see FIG. 4).

1.2.3 Job Processing

Figure 8:
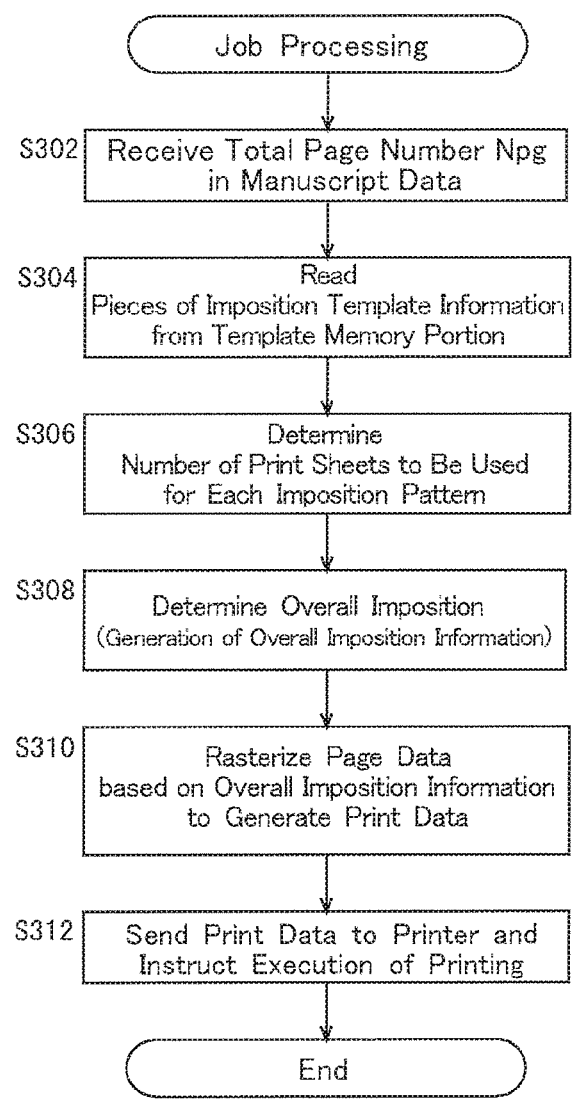
FIG. 8 is a flowchart showing job processing in the embodiment.

Next, job processing for implementing the job processing portion 140 of the print control device 10 shown in FIG. 4 in the form of software on the execution management computer will be described with reference to FIG. 8. FIG. 8 is a flowchart showing the job processing. In the job processing, the CPU 111 operates as below in accordance with a predetermined program included in the aforementioned print control program.

When the input reception process is performed on new manuscript data Dd, the CPU 111 receives a total page number Npg in the manuscript data Dd (step S302). Next, the CPU 111 reads imposition template information $Dtp_k$ (where k=1, 2, . . . ) indicating imposition patterns for two or more types of print sheets corresponding to the manuscript data Dd, from the template memory portion 160 (step S304). Thereafter, the CPU 111 determines the number of print sheets to be used for each of the two or more types, i.e., for each imposition pattern (step S306). The details of step S306 will be described below. Note that it is assumed below that the manuscript data Dd corresponds to the following two types of print sheets: a first print sheet having a sheet length $Siz_1$; and a second print sheet having a sheet length $Siz_2$. It is also assumed below that the template memory portion 160 has stored therein imposition template information $Dtp_1$ and $Dtp_2$ for the first and second print sheets.

Here, two pages can be imposed widthwise on each of the first and second print sheets (i.e., four pages in total on the front and back sides of each sheet). More specifically, the number Wpg of pages that can be laid out widthwise on each sheet is four. Moreover, the total page number Npg in the manuscript data Dd is 160, the number of pages imposed on the first print sheet is 12 (see imposition layout (B) in FIG. 11), and the number of pages imposed on the second print sheet is 8 (see imposition layout (C) in FIG. 11). The total page number Npg is a multiple of the number Wpg of pages that can be laid out widthwise on each sheet, i.e., a multiple of 4, and in this example, the total page number Npg is 160, which is also a multiple of 4. Moreover, the numbers of pages imposed on the first and second print sheets are respectively 12 and 8, which are also multiples of 4, and the difference therebetween, i.e., the difference between 12 and 8, is 4. Accordingly, the number of first print sheets to be used, n1, and the number of second print sheets to be used, n2, can be obtained as below so as not to waste paper.

In general, heavy sections are preferred, and therefore, it is desirable to increase the number of print sheets with the longer length (in this example, the first print sheet). Considering this and also the number of pages imposed on the first print sheet, which is 12, the number of first print sheets to be used is conceivably set to 14 on the basis of the calculations 12×14=168 and 12×13=156. However, when 14 first print sheets are used alone, 12×14=168>Npg=160, resulting in some paper waste. Therefore, the number of first print sheets, for which the number of pages imposed per sheet is 12, is reduced by two, and two second print sheets, for which the number of pages imposed per sheet is 8, are used, i.e., 12×12+8×2=160 (=Npg), resulting in no paper waste. That is, the total number of pages imposed on the 12 first print sheets and the two second print sheets, which is 160, equals the total page number in the manuscript data Dd.

More generally, on the premise that the numbers of pages imposed on the first and second print sheets are respectively m1 and m2, the total page number Npg and the numbers m1 and m2 are all multiples of the number Wpg of pages that can be laid out widthwise on each sheet, i.e., multiples of 4, and m1−m2=Wpg, the numbers Np1 and Np2 of first and second print sheets that prevent paper waste can be obtained by procedures (P1) to (P3) below. Under the condition where no paper is wasted, procedures (P1) to (P3) maximize the number of first or second print sheets having the longer length.

(P1): Calculate the (tentative) number Nt1 of first print sheets that satisfies both m1×Nt1 Npg and m1×(Nt1−1)<Npg.

(P2): Calculate Δn=(m1×Nt1−Npg)/Wpg (=4).

(P3): Calculate the numbers Np1 and Np2 of first and second print sheets by Np1=Nt1−Δn and Np2=Δn.

When the numbers Np1 and Np2 of first and second print sheets to be used (i.e., the numbers of sheets to be used for respective imposition patterns) are determined as described above, overall imposition information Dly specifying imposition layouts of all pages in the manuscript data Dd, i.e., overall imposition, is then generated on the basis of the numbers Np1 and Np2 and imposition information $Dfly_1$ and $Dfly_2$.

In the present embodiment, as described above, since the imposition patterns for the first and second print sheets are predetermined (i.e., the imposition information $Dfly_1$ and $Dfly_2$ for the first and second print sheets are generated in advance) and printing is performed on a continuous roll of paper (see FIG. 2), overall imposition is determined by setting the order of one-dimensional arrangement of the first and second print sheets, the numbers of which are respectively Np1 and Np2. In general, from the perspective of the strength of a book product to be created, a preferable order of arrangement is such that print sheets having the shorter length are sandwiched between print sheets having the longer length. Accordingly, in the present embodiment, the overall imposition is determined such that, of the first and second print sheets, the shorter print sheets (referred to below as the "short sheets") are sandwiched between the longer print sheets (referred to below as the "long sheets"). To this end, the long sheets are placed at the beginning and the end of the one-dimensional arrangement that determines the overall imposition. However, depending on the situation, the long sheet may be placed only at either the beginning or the end of the one-dimensional arrangement. For example, when the number of long sheets to be used, which is determined by procedures (P1) and (P2), i.e. the number of either first or second print sheets having the longer length, is one, the long sheet is simply placed at either the beginning or the end of the one-dimensional arrangement.

For example, assuming that imposition template information Dtp1 for the first print sheet, on which 16 pages are to be imposed, and imposition template information Dtp2 for the second print sheet, on which 12 pages are to be imposed, are read out from the template memory portion 160 and printing is performed on the basis of manuscript data Dd in which the total page number Npg is 100, the numbers Np1 and Np2 of first and second print sheets to be used are respectively calculated as 4 and 3 at step S306 on the basis of the calculation 16×4+12×3=100. Accordingly, three examples (L1) to (L3) below are conceivable for the one-dimensional arrangement of the first and second print sheets that specifies the overall imposition to be determined at step S308. In the following examples, "S1(16)" represents the first print sheet, and "S2(12)" represents the second print sheet.

(L1): S1(16)→S1(16)→S1(16)→S2(12)→S2(12)→S2(12)→S1(16)

(L2): S1(16)→S2(12)→S2(12)→S2(12)→S1(16)→S1(16)→S1(16)

(L3): S1(16)→S2(12)→S1(16)→S2(12)→S1(16)→S2(12)→S1(16)

Note that from the perspective of throughput in creating a book product, it is preferable to successively place the same type of print sheets (i.e., print sheets having the same length). In view of this, as for arrangement examples (L1) to (L3), (L1) and (L2) are preferred over (L3). Moreover, the overall imposition in the above case is not limited to arrangement examples (L1) to (L3), and other orders of arrangement can be employed so long as the long sheets, i.e., the first print sheets, are placed at the beginning and the end.

Once the overall imposition information Dly specifying overall imposition as above is generated, page data Dpg in the manuscript data Dd is rasterized on the basis of the overall imposition information Dly, with the result that bitmap data representing a print target is generated as raster data (target raster data) Drs (step S310).

Thereafter, the target raster data Drs and the overall imposition information Dly are transmitted to the printer 20 as print data Dpr after being subjected to a data format change as necessary. At this time, the print control device 10 also transmits a print execution control signal Cex1 to the printer 20 in order to control the printer 20. As a result, the printer 20 is instructed to perform printing in accordance with the print data Dpr.

In the job processing as above, the imposition information generation portion 142 in the job processing portion 140 is implemented by steps S302 to S308, and also, the rasterization process portion 144 and the print execution instruction portion 146 are respectively implemented by steps S310 and S312 (see FIG. 4). Moreover, the sheet number determination portion 152 in the imposition information generation portion 142 is implemented by steps S302 to S306, and the overall imposition information determination portion 154 in the imposition information generation portion 142 is implemented by steps S304 and S308 (see FIG. 5A).

1.3 Printing Process

Figure 9:
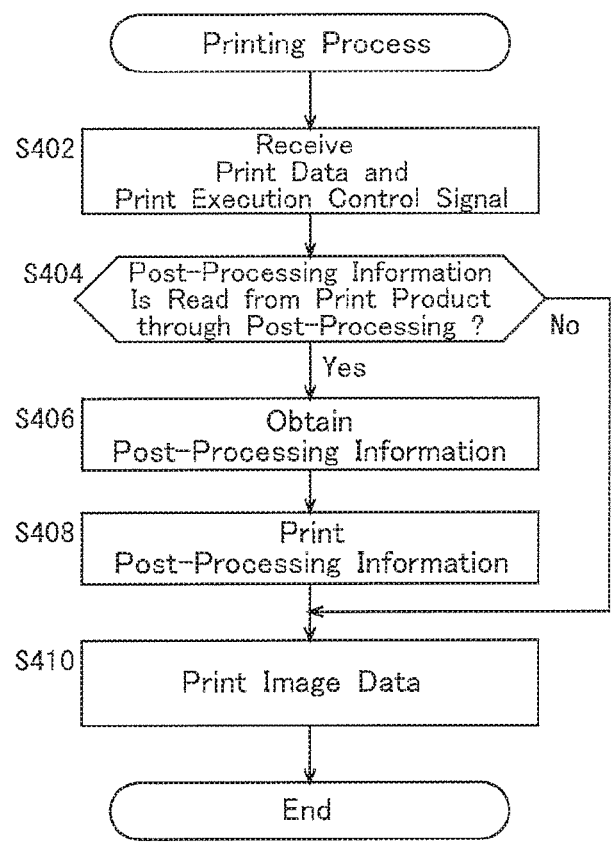
FIG. 9 is a flowchart showing a printing process by a printer controlled by the print control device according to the embodiment.

Next, a printing process performed by the printer 20 using the target raster data Drs received from the print control device 10, in accordance with the print execution control signal Cex1, will be described with reference to FIG. 9. FIG. 9 is a flowchart showing the printing process.

Once the print data Dpr, which is obtained through the job processing (see FIGS. 4 and 8) by the execution management computer 10 serving as the print control device, is transmitted to the printer 20 along with the print execution control signal Cex1, the printer 20 operates as below.

First, the printer 20 receives the print data Dpr along with the print execution control signal Cex1 (step S402) and determines whether to read post-processing information from a print product through post-processing, in accordance with the print execution control signal Cex1 (step S404). Here, the post-processing includes processing tasks executed after the printing process performed by the printer 20 but before completion of a book product. Examples of the processing tasks include cutting by the cutter 32 and folding by the folder 34. The post-processing information includes position information for use in post-processing tasks, e.g., information specifying positions (cutting positions) at which the cutter 32 cuts a roll of paper (i.e., continuous paper) after printing to a sheet length $Siz_k$ indicated by overall imposition information Dly. The post-processing information also includes information specifying a folding manner for the folding task, including folding positions.

When the determination result at step S404 is to read post-processing information, the printer 20 receives post-processing information from the execution management computer 10 (step S406). Here, when the print data Dpr received at step S402 includes post-processing information, the post-processing information is extracted from the print data Dpr. Next, the post-processing information is printed out (step S408), and thereafter, the process advances to step S410.

On the other hand, when the determination result at step S404 is to not read post-processing information, the process advances to step S410 without printing out post-processing information.

At step S410, image data included in the print data Dpr (i.e., bitmap image data corresponding to the manuscript data Dd) is printed out (step S410). This ends the printing process that corresponds to a single print job.

1.4 Post-Processing

Next, the post-processing performed by the post-processing device 30, which includes the cutter 32 and the folder 34, on the roll of paper subjected to the printing process by the printer 20 (referred to below as the "printed roll of paper") will be described with reference to FIG. 10. In the following description, for convenience's sake, the post-processing simply includes cutting by the cutter 32 and folding by the folder 34 (see FIG. 1).

The execution management computer 10 functions as a post-processing control device that manages processing tasks performed by the post-processing device by causing the CPU 111 to execute a predetermined control program instead of the print control program. The execution management computer 10 serving as the post-processing control device transmits an execution control signal Cex2 to the post-processing device 30 after completion of the printing process by the printer 20 (up to this point, the printed roll of paper is loaded at a predetermined position in order to start the post-processing). Once the execution control signal Cex2 is transmitted, the post-processing device 30 operates as below.

First, the post-processing device 30 receives the execution control signal Cex2 (step S502). Next, on the basis of the execution control signal Cex2, the post-processing device 30 determines whether to read post-processing information from the printed product (i.e., the printed roll of paper) through post-processing (step S504).

Figures 12A, 12B:
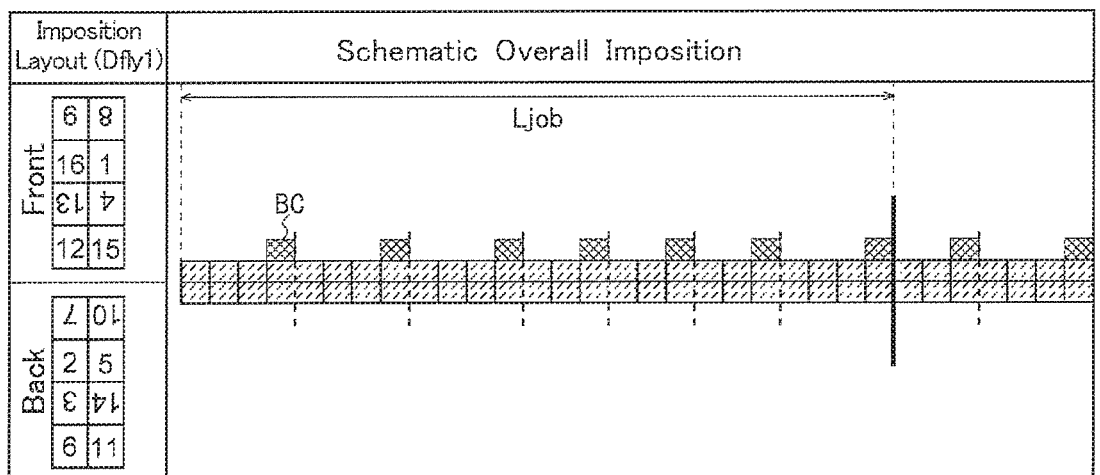
FIG. 12A is a diagram schematically illustrating overall imposition in order to describe effects of the embodiment.
FIG. 12B is a diagram showing detailed layouts in a portion of the overall imposition in the embodiment in which both the first and second print sheets are included.

When the determination result at step S504 is to read the post-processing information, for example, the printed roll of paper has marks printed in the form of barcodes BC, as shown in FIG. 12A, indicating cutting positions at which the printed roll of paper is cut by the cutter 32 to the sheet length $Siz_k$ specified by the overall imposition information Dly (see step S408 in FIG. 9). Next, a post-processing information reading portion 302 in the post-processing device 30 (see FIG. 4) reads the post-processing information from the printed roll of paper (step S506). Thereafter, the process advances to step S510.

On the other hand, when the determination result at step S504 is to not read the post-processing information, the post-processing device 30 receives post-processing information from the execution management computer 10 serving as the post-processing control device, via the network 3 or another communication means such as a cable (step S508). Thereafter, the process advances to step S510.

At step S510, the cutter 32 serving as a processing portion 304 in the post-processing device 30 (see FIG. 4) cuts the printed roll of paper in accordance with the post-processing information (e.g., at cutting positions indicated by the barcodes BC shown in FIG. 12A). As a result, the printed roll of paper is cut to two or more sheet lengths $Siz_k$ (where k=1, 2, . . . ) specified by the overall imposition information Dly generated at step S308 in FIG. 8, resulting in two or more types of print sheets. For example, in the case of the overall imposition shown in FIG. 12A, four first print sheets having the length $Siz_1$ (i.e., the number of imposed pages is 16) and three second print sheets having the length $Siz_2$ (i.e., the number of imposed pages is 12) are obtained.

Next, at step S512, the folder 34 folds each of the two or more types of print sheets obtained through the cutting by the cutter 32, in accordance with the post-processing information. As a result, each of two or more types of fold sections is obtained in a plurality of sets. For example, in the case of the overall imposition shown in FIG. 12A, four fold sections based on the first imposition layout ($Dfly_1$: the number of imposed pages=16) and three fold sections based on the second imposition layout ($Dfly_2$: the number of imposed pages=12) are obtained.

Figure 10:
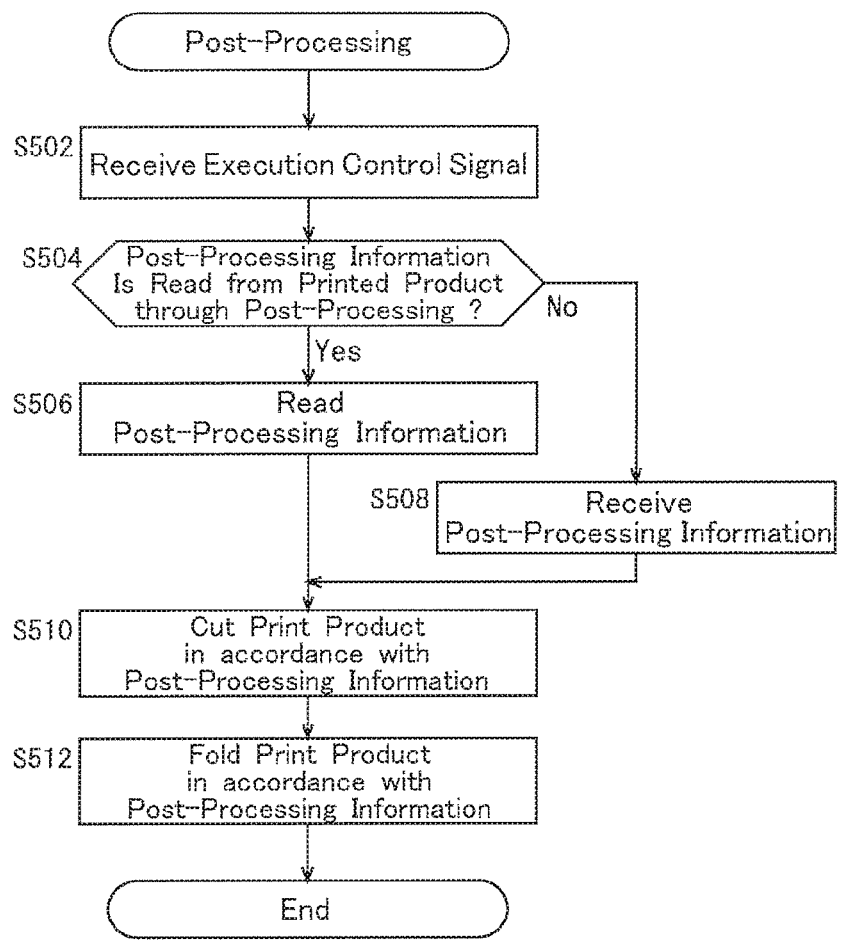
FIG. 10 is a flowchart showing post-processing on a print product obtained by the printing process.

The post-processing shown in FIG. 10 ends by executing step S512, but in actuality, the plurality sets of sections are stacked in predetermined order by a collating machine and bound by a binding machine, and thereafter, three-side trimming is performed by a trimming machine on the basis of trimming information, thereby completing a book product. These are similar to conventional post-processing tasks, and therefore, any detailed descriptions thereof will be omitted.

1.5 Advantageous Effects

Figure 11:
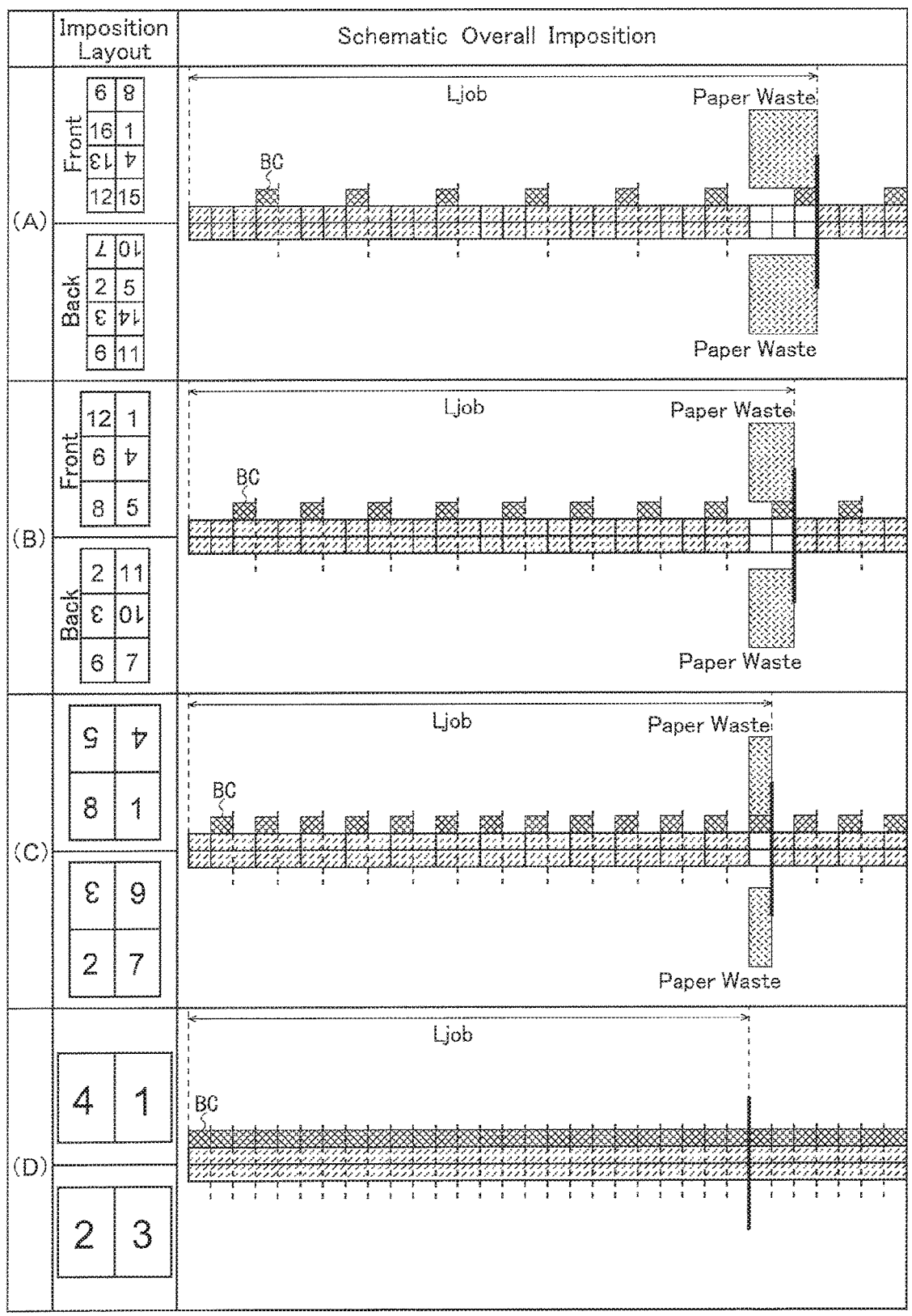
FIG. 11 is a diagram describing a problem in creating a book product using a conventional print control device.

Advantageous effects of the present embodiment as above will be described below with reference to FIGS. 11 and 12A. FIG. 11 is a diagram describing problems in creating a book product using a conventional print control device, and FIG. 12A is a diagram describing the advantageous effects of the embodiment.

In the case of the conventional print control device, the sheet length is fixed for a single print job, and all print sheets that are to form sections have the same size (hence, the same number of imposed pages). FIG. 11 schematically illustrates imposition layouts and overall imposition where the sheet length (i.e., the print sheet size) Siz is changed for the conventional print control device to create book products for which the total page number Npg in manuscript data Dd is 100. More specifically, FIG. 11 provides schematic illustrations of the imposition layouts and the overall imposition for (A) a sheet length $Siz_1$ corresponding to a type of print sheet for which the number of imposed pages is 16, (B) a sheet length $Siz_2$ corresponding to a type of print sheet for which the number of imposed pages is 12, (C) a sheet length $Siz_3$ corresponding to a type of print sheet for which the number of imposed pages is 8, and (D) a sheet length $Siz_4$ corresponding to a type of print sheet for which the number of imposed pages is 4.

In FIG. 11, Ljob indicates the length of paper (a roll of paper) to be used for a single print job, areas hatched with oblique dotted lines represent portions of the paper that correspond to the total page number Npg (=100) in the manuscript data Dd, and unhatched areas represent unprinted portions of the paper, i.e., paper waste. In addition, in FIG. 11, cross-hatched rectangles represent barcodes BC, which serve as post-processing information that indicates cutting positions for the cutter 32. The cutter 32 cuts the roll of paper at the positions indicated by the barcodes BC, more precisely, the positions being indicated by vertical, thick dotted lines in FIG. 11. The same notation as in FIG. 11 is used in FIG. 12A as well.

As has been described earlier, from the perspective of post-processing workability and the strength of the book product, it is preferable to increase the length of the print sheet with a view to increasing the weight of a single section. However, as can be appreciated from parts (A) to (D) in FIG. 11, when the number of pages imposed per print sheet is increased by increasing the sheet length, more paper is wasted.

On the other hand, in the present embodiment, overall imposition is determined using imposition template information $Dtp_k$ (where k=1, 2, . . . ) indicating imposition patterns for two or more types of print sheets for a single print job, more precisely, the imposition patterns corresponding to manuscript data Dd for the print job, (see FIGS. 5A and 5B, and S304 to S308 in FIG. 8), thereby increasing print sheet lengths while suppressing paper waste. For example, in the case where two imposition patterns shown in FIG. 12A as imposition layouts, which are a first imposition pattern for the sheet length $Siz_1$ and 16 imposed pages and a second imposition pattern for the sheet length $Siz_2$ and 12 imposed pages, are used, when the total page number Npg in the manuscript data Dd is 100, the number Np1 of first print sheets used with the first imposition pattern and the number Np2 of second print sheets used with the second imposition pattern are determined such that Np1=4 and Np2=3 (see procedures (P1) to (P3) described earlier). In this case, no paper is wasted, as shown in FIG. 12A, and the length $Siz_1$ of the first print sheet and the length $Siz_2$ of the second print sheet respectively correspond to 16 and 12 imposed pages and therefore are relatively long. Note that FIG. 12B shows detailed layouts in a portion of the overall imposition in which both the first and second print sheets are included.

In this manner, the present embodiment renders it possible to increase print sheet lengths while suppressing paper waste in printing for book product creation. As a result, the weight of a single section is increased, whereby post-processing workability for book product creation is improved and book product strength is increased. Note that it is also possible to automatically determine overall imposition so as not to waste paper, on the basis of procedures (P1) to (P3) described earlier, thereby achieving the effect of saving the effort of designing the overall imposition. Moreover, it is preferable to determine the number of print sheets to be used such that the longer of two or more types of print sheets prepared for manuscript data Dd is prioritized, as in procedures (P1) to (P3). This further improves the post-processing workability and the book product strength.

In the present embodiment, as can be appreciated from the schematic illustrations of the overall imposition shown in FIG. 12A, overall imposition is determined such that, of the first and second print sheets, the shorter print sheets, i.e., the short sheets, are sandwiched between the longer print sheets, i.e., the long sheets, (see arrangement examples (L1) to (L3) above). This is effective in increasing book product strength and also renders it possible to create a more securely bound book product.

2. Variants

Figure 13:
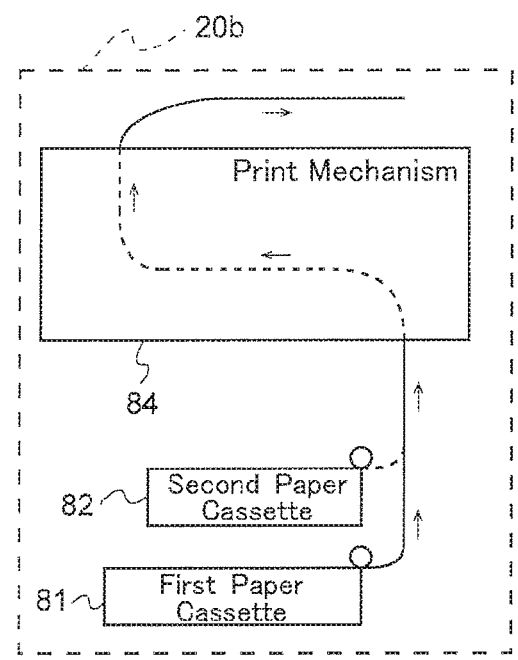
FIG. 13 is a block diagram illustrating another example of the printer controlled by the print control device according to the embodiment.

In the embodiment, the print control device 10 is used with the printer 20 designed to perform printing on continuous paper as exemplified by a roll of paper, but the print control device 10 can be used with a printer adapted to print a plurality of imposition patterns (i.e., imposition layouts) by switching between two or more types of cut sheets in different sizes (e.g., in different lengths). FIG. 13 is a diagram illustrating a schematic configuration example of such a printer 20b. The printer 20b includes two paper cassettes, a first paper cassette 81 and a second paper cassette 82, and a print mechanism 84 for performing printing on a cut sheet supplied from the first or second paper cassette 81 or 82. The printer 20b is configured such that the cassette that supplies a sheet to the print mechanism 84 is switched between the first paper cassette 81 and the second paper cassette 82. The printer 20b as above achieves advantageous effects similar to those achieved in the embodiment, by switching between the first paper cassette 81 and the second paper cassette 82 on the basis of overall imposition as determined at step S308 in FIG. 8. Note that in the case where the print control device 10 according to the embodiment is used with the printer 20b as above, the print execution instruction portion 146 preferably generates print data Dpr that includes control information for switching between the first and second paper cassettes 81 and 82 on the basis of overall imposition information Dly.

In the embodiment, the print control device 10 is used with the inkjet printer 20, but other types of printers can be employed so long as variable data printing is possible. For example, a transfer printer, in which ink is transferred initially to an intermediate transfer member and then to a printing medium such as paper, can be used instead of an inkjet printer, in which ink is directly applied to such a printing medium.

The embodiment has been described above with respect to the approach that determines the numbers Np1 and Np2 of first and second print sheets so as not to waste paper on the premise that the numbers of pages imposed on the first and second print sheets prepared for the manuscript data Dd are respectively m1 and m2, the total page number Npg and the numbers of imposed pages m1 and m2 are all multiples of 4, and m1−m2=4 (see procedures (P1) to (P3)). However, the embodiment may employ other approaches that are not based on the above premise or may tolerate some paper waste. For example, on the basis of the numbers of pages imposed on two or more types of print sheets prepared for the manuscript data Dd, the number of print sheets may be determined for each type such that the sum Nsum of the products obtained by respectively multiplying the numbers of pages imposed on the two or more types of print sheets by the numbers of these print sheets is greater than or equal to the total page number Npg in the manuscript data Dd and the difference between the sum Nsum and the total page number Npg is less than the minimum of the numbers of pages imposed on the two or more types of print sheets. For example, in the case where first and second print sheets are prepared for the manuscript data Dd, three pages are assigned widthwise on each print sheet, the number of imposed pages is 3×3×2=18 for the first print sheet and also 3×2×2=12 for the second print sheet, when the total page number Npg is 100, the numbers Np1 and Np2 of first and second print sheets to be used may be respectively set to 5 and 1 with a view to prioritize using more first print sheets (i.e., more long sheets). In this case, the total number of imposed pages is greater than the total page number Npg by two, as calculated by 18×5+12×1=102>Npg=100, resulting in two pages of waste, but the advantageous effects of improving post-processing workability and increasing book product strength can be achieved as in the embodiment.

In the embodiment, two or more types of print sheets to be used for a print job corresponding to the manuscript data Dd are predetermined, and the number Wpg of pages that can be laid out widthwise on each sheet (referred to below as the "widthwise page number") is also predetermined. However, the print control device may be configured such that, once the input reception portion 120 accepts new manuscript data Dd, the imposition information generation portion 142 in the job processing portion 140 receives information about a page size Psz for the manuscript data Dd, along with the total page number Npg, in order to determine the widthwise page number Wpg and also determine imposition template information $Dtp_k$ for the print sheets to be used, on the basis of the widthwise page number Wpg. The print control device thus configured will be described below as a variant of the embodiment. Note that in the configuration of the variant, elements that are the same as or correspond to those in the embodiment are denoted by the same reference characters, and any detailed descriptions thereof will be omitted.

Assuming that the imposition information generation portion 142 includes the sheet number determination portion 152 and the overall imposition information determination portion 154, as shown in FIG. 5A, in the present variant, the sheet number determination portion 152 receives information about manuscript data Dd, including a page size Psz and a total page number Npg, from the input reception portion 120, as well as imposition information $Dfly_1$ and $Dfly_2$ and information about sheet lengths $Siz_1$ and $Siz_2$ for predetermined first and second print sheets, from the template memory portion 160. The sheet number determination portion 152 calculates a widthwise page number Wpg, which is the number of pages that can be laid out widthwise (in a direction perpendicular to a conveyance direction) on print paper 22, which is continuous paper, on the basis of the page size Psz and the imposition information $Dfly_1$ and $Dfly_2$ for the first and second print sheets. For example, in the case where the page size Psz for the manuscript data Dd is A4 portrait, and two pages can be laid out widthwise on each of the first and second print sheets (i.e., four pages in total on the front and back sides of the sheet), the widthwise page number Wpg is determined to be four. On the other hand, even if the sheet width is the same, when the page size Psz for the manuscript data Dd is A5 portrait, the widthwise page number Wpg is determined to be six. Then, on the basis of the widthwise page number Wpg thus determined, the sheet number determination portion 152 determines the numbers Np1 and Np2 of first and second print sheets to be used, by performing a predetermined computation process based on the total page number Npg and the sheet lengths $Siz_1$ and $Siz_2$, such that the total number Nsum of pages imposed on the first and second print sheets (i.e., the sum of the products obtained by respectively multiplying the numbers of pages imposed on the first and second print sheets by the numbers of the first and second print sheets) equals the total page number Npg in the manuscript data Dd (details of the determination process are similar to those of the determination process described in the embodiment or in conjunction with another variant described earlier). Other features and operations in this variant are the same as in the embodiment. The variant as above also achieves advantageous effects similar to those as achieved in the embodiment.

The embodiment has been described with respect to the processing of a piece of manuscript data Dd per print job, but more than a piece of manuscript data (i.e., a plurality of files) may be processed per print job.

While the invention has been described in detail, the foregoing description is in all aspects illustrative and not restrictive. It is understood that numerous other modifications and variations can be devised without departing from the scope of the invention.

3. Other

This application claims priority to Japanese Patent Application No. 2017-171628, filed Sep. 6, 2017 and entitled "PRINT CONTROL DEVICE, PRINT CONTROL METHOD, AND PRINT CONTROL PROGRAM", the disclosure of which is incorporated herein by reference.

What is claimed is:

1. A print control device for receiving manuscript data for a print job in bookbinding and for generating print data to be provided to a printer on the basis of the manuscript data, the device comprising:
    a template memory portion having imposition template information stored for each of two or more types of print sheets that are to form sections for use in bookbinding, wherein the imposition template information indicates positions and orientations of pages to be imposed on the print sheets and lengths of the print sheets, and the two or more types of print sheets are different in number of pages to be imposed;
    a sheet number determination portion configured to determine the number of print sheets for each of the two or more types on the basis of the number of pages to be imposed on each of the two or more types of print sheets, indicated by the imposition template information, such that a sum of products obtained by respectively multiplying the numbers of pages to be imposed on the two or more types of print sheets by the numbers of the two or more types of print sheets is greater than or equal to a total number of pages in the manuscript data and a difference between the sum and the total number of pages in the manuscript data is less than a minimum of the numbers of pages imposed on the two or more types of print sheets;
    an overall imposition information determination portion configured to generate overall imposition information on the basis of the imposition template information stored in the template memory portion and the number of print sheets determined for each of the two or more types by the sheet number determination portion, wherein the overall imposition information specifies imposition layouts of all pages in the manuscript data; and
    a print data generation portion configured to generate the print data on the basis of the manuscript data and the overall imposition information.

2. The print control device according to claim 1, wherein the sheet number determination portion determines the number of print sheets for each of the two or more types on the basis of the numbers of pages indicated by the imposition template information and a user input operation.

3. The print control device according to claim 1, wherein the template memory portion has the imposition template information stored for each of two types of print sheets, the two types being first and second print sheets.

4. The print control device according to claim 3, wherein the overall imposition information determination portion generates the overall imposition information such that either a first or last page in the manuscript data is imposed on the first or second print sheet on which more pages are imposed.

5. The print control device according to claim 3, wherein the overall imposition information determination portion generates the overall imposition information such that both first and last pages in the manuscript data are imposed on the first or second print sheets on which more pages are imposed.

6. The print control device according to claim 3, wherein the sheet number determination portion determines the numbers of first and second print sheets such that a sum of a product of the number of pages to be imposed on the first print sheet multiplied by the number of first print sheets and a product of the number of pages to be imposed on the second print sheet multiplied by the number of second print sheets, equals the total number of pages in the manuscript data.

7. The print control device according to claim 3, wherein,
    the number of pages to be imposed on each of the first and second print sheets is a multiple of 4,
    the first and second print sheets are different in number of pages to be imposed by four, and
    when the total number of pages in the manuscript data is a multiple of 4, the sheet number determination portion determines the numbers of first and second print sheets such that a sum of a product of the number of pages to be imposed on the first print sheet multiplied by the number of first print sheets and a product of the number of pages to be imposed on the second print sheet multiplied by the number of second print sheets, equals the total number of pages in the manuscript data.

8. The print control device according to claim 7, wherein, provided that the sum equals the total number of pages in the manuscript data, the sheet number determination portion determines the numbers of first and second print sheets such that the number of first or second print sheets on which more pages are imposed per sheet is maximized.

9. The print control device according to claim 1, wherein,
    the printer is a variable data printer that performs printing on a continuous recording medium in accordance with the print data, and
    the print data generation portion generates the print data on the basis of the overall imposition information such that the print data includes information indicating positions at which to cut the recording medium to sizes corresponding to the two or more types of print sheets.

10. The print control device according to claim 1, wherein the printer is a variable data printer including two or more paper supply units respectively holding the two or more types of print sheets, and the two or more paper supply units are switchable in order to perform printing on the two or more types of print sheets in accordance with the print data.

11. A print control method for generating print data to be provided to a printer on the basis of manuscript data received for a print job in bookbinding, the method comprising:
    a template storing step of storing imposition template information into a template memory portion for each of two or more types of print sheets that are to form sections for use in bookbinding, wherein the imposition template information indicates positions and orientations of pages to be imposed on the print sheets and lengths of the print sheets, and the two or more types of print sheets are different in number of pages to be imposed;

a sheet number determination step of determining the number of print sheets for each of the two or more types on the basis of the number of pages to be imposed on each of the two or more types of print sheets, indicated by the imposition template information, such that a sum of products obtained by respectively multiplying the numbers of pages to be imposed on the two or more types of print sheets by the numbers of the two or more types of print sheets is greater than or equal to a total number of pages in the manuscript data and a difference between the sum and the total number of pages in the manuscript data is less than a minimum of the numbers of pages imposed on the two or more types of print sheets;

an overall imposition information determination step of generating overall imposition information on the basis of the imposition template information stored in the template memory portion and the number of print sheets determined for each of the two or more types by the sheet number determination step, wherein the overall imposition information specifies imposition layouts of all pages in the manuscript data; and a print data generation step of generating the print data on the basis of the manuscript data and the overall imposition information.

12. The print control method according to claim 11, wherein in the template storing step, the imposition template information is stored into the template memory portion for each of two types of print sheets, the two types being first and second print sheets.

13. The print control method according to claim 12, wherein in the overall imposition information determination step, the overall imposition information is generated such that both first and last pages in the manuscript data are imposed on the first or second print sheets on which more pages are imposed.

14. The print control method according to claim 12, wherein in the sheet number determination step, the numbers of first and second print sheets are determined such that a sum of a product of the number of pages to be imposed on the first print sheet multiplied by the number of first print sheets and a product of the number of pages to be imposed on the second print sheet multiplied by the number of second print sheets, equals the total number of pages in the manuscript data.

15. The print control method according to claim 12, wherein,
the number of pages to be imposed on each of the first and second print sheets is a multiple of 4,
the first and second print sheets are different in number of pages to be imposed by four, and
in the sheet number determination step, when the total number of pages in the manuscript data is a multiple of 4, the numbers of first and second print sheets are determined such that a sum of a product of the number of pages to be imposed on the first print sheet multiplied by the number of first print sheets and a product of the number of pages to be imposed on the second print sheet multiplied by the number of second print sheets, equals the total number of pages in the manuscript data.

16. A non-transitory computer readable recording medium storing a print control program for generating print data to be provided to a printer on the basis of manuscript data received for a print job in bookbinding, the program causing a computer to execute:

a template storing step of storing imposition template information into a template memory portion for each of two or more types of print sheets that are to form sections for use in bookbinding, wherein the imposition template information indicates positions and orientations of pages to be imposed on the print sheets and lengths of the print sheets, and the two or more types of print sheets are different in number of pages to be imposed;

a sheet number determination step of determining the number of print sheets for each of the two or more types on the basis of the number of pages to be imposed on each of the two or more types of print sheets, indicated by the imposition template information, such that a sum of products obtained by respectively multiplying the numbers of pages to be imposed on the two or more types of print sheets by the numbers of the two or more types of print sheets is greater than or equal to a total number of pages in the manuscript data and a difference between the sum and the total number of pages in the manuscript data is less than a minimum of the numbers of pages imposed on the two or more types of print sheets;

an overall imposition information determination step of generating overall imposition information on the basis of the imposition template information stored in the template memory portion and the number of print sheets determined for each of the two or more types by the sheet number determination step, wherein the overall imposition information specifies imposition layouts of all pages in the manuscript data; and a print data generation step of generating the print data on the basis of the manuscript data and the overall imposition information.

17. The recording medium according to claim 16, wherein in the template storing step, the imposition template information is stored into the template memory portion for each of two types of print sheets, the two types being first and second print sheets.

18. The recording medium according to claim 17, wherein in the overall imposition information determination step, the overall imposition information is generated such that both first and last pages in the manuscript data are imposed on the first or second print sheets on which more pages are imposed.

19. The recording medium according to claim 17, wherein in the sheet number determination step, the numbers of first and second print sheets are determined such that a sum of a product of the number of pages to be imposed on the first print sheet multiplied by the number of first print sheets and a product of the number of pages to be imposed on the second print sheet multiplied by the number of second print sheets, equals the total number of pages in the manuscript data.

20. The recording medium according to claim 17, wherein,
the number of pages to be imposed on each of the first and second print sheets is a multiple of 4, the first and second print sheets are different in number of pages to be imposed by four, and in the sheet number determination step, when the total number of pages in the manuscript data is a multiple of 4, the numbers of first and second print sheets are determined such that a sum of a product of the number of pages to be imposed on the first print sheet multiplied by the number of first print sheets and a product of the number of pages to be imposed on the second print sheet multiplied by the number of second print sheets, equals the total number of pages in the manuscript data.

\* \* \* \* \*